(12) United States Patent
Venida et al.

(10) Patent No.: US 9,481,490 B2
(45) Date of Patent: Nov. 1, 2016

(54) SYSTEM FOR COUPLING ACCESSORY DEVICES TO A PORTABLE ELECTRONIC DEVICE

(71) Applicant: ACCO Brands Corporation, Lake Zurich, IL (US)

(72) Inventors: A. John Venida, San Francisco, CA (US); John Hung, Vancouver (CA); Barry Marshall, Santa Clara, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 293 days.

(21) Appl. No.: 14/095,665

(22) Filed: Dec. 3, 2013

(65) Prior Publication Data
US 2015/0151879 A1 Jun. 4, 2015

(51) Int. Cl.
| A45F 3/00 | (2006.01) |
| B65D 25/20 | (2006.01) |
| A45F 5/00 | (2006.01) |
| H04M 1/04 | (2006.01) |
| A45F 5/02 | (2006.01) |
| H04B 1/3888 | (2015.01) |

(52) U.S. Cl.
CPC ............. *B65D 25/20* (2013.01); *A45F 5/00* (2013.01); *A45F 5/021* (2013.01); *H04M 1/04* (2013.01); *A45F 2005/006* (2013.01); *A45F 2005/008* (2013.01); *A45F 2200/0516* (2013.01); *H04B 1/3888* (2013.01); *Y10T 29/49826* (2015.01)

(58) Field of Classification Search
CPC ............. A45F 2200/0516; A45F 2005/006; A45F 2005/008
USPC ..................... 224/191, 666, 668; 455/575.1
See application file for complete search history.

(56) References Cited

U.S. PATENT DOCUMENTS

| 6,264,079 B1 * | 7/2001 | Skaggs ............... F41C 33/0236 224/193 |
| 6,695,269 B1 | 2/2004 | Anscher |
| 6,752,299 B2 * | 6/2004 | Shetler ..................... A45F 5/02 224/197 |

(Continued)

FOREIGN PATENT DOCUMENTS

KR        20130117212        10/2013

OTHER PUBLICATIONS

Combined Search and Examination Report from the United Kingdom Intellectual Property Office for Application No. GB1417452.8 dated Mar. 26, 2015 (6 pages).

(Continued)

*Primary Examiner* — Justin Larson
*Assistant Examiner* — Lester L Vanterpool
(74) *Attorney, Agent, or Firm* — Michael Best & Friedrich LLP

(57) ABSTRACT

A system for coupling accessory devices to a portable electronic device includes a casing that receives the portable electronic device. The casing has a front opening through which a display screen of a portable electronic device is accessible to a user, and a rear opening. The system further includes a plate element that is inserted into the casing and is positioned adjacent the rear opening such that a portion of the plate element is exposed by the rear opening. The system further includes an accessory device coupled to the plate element. The accessory device has an inner portion and an outer portion, such that when the accessory device is coupled to the plate element, at least part of the plate element is between the inner portion and the outer portion.

19 Claims, 9 Drawing Sheets

(56) References Cited

U.S. PATENT DOCUMENTS

| | | | | |
|---|---|---|---|---|
| 6,955,279 | B1* | 10/2005 | Mudd | A45F 5/02 224/197 |
| 6,966,519 | B2* | 11/2005 | Salentine | A45F 5/004 224/162 |
| 8,251,210 | B2 | 8/2012 | Schmidt et al. | |
| 8,328,055 | B1* | 12/2012 | Snyder | A45F 5/00 224/197 |
| 8,408,513 | B2 | 4/2013 | Smith | |
| 8,584,916 | B1* | 11/2013 | Chen | A45F 5/021 224/199 |
| 8,616,422 | B2* | 12/2013 | Adelman | A45F 5/00 224/191 |
| 8,631,980 | B2* | 1/2014 | Youssefi-Shams | A45F 5/02 224/197 |
| 8,746,448 | B1 | 6/2014 | Bellace | |
| 8,800,762 | B2* | 8/2014 | Fathollahi | H04B 1/3888 206/320 |
| 9,004,333 | B2* | 4/2015 | Monaco | A45C 11/00 206/320 |
| 9,027,814 | B2* | 5/2015 | Tages | A45F 5/021 224/666 |
| 2006/0237495 | A1* | 10/2006 | Chen | A45F 5/02 224/197 |
| 2007/0163904 | A1* | 7/2007 | Martin | A45C 11/00 206/316.1 |
| 2009/0036175 | A1* | 2/2009 | Brandenburg | A45F 5/02 455/575.1 |
| 2010/0200628 | A1* | 8/2010 | Tages | A45F 5/02 224/269 |
| 2010/0224519 | A1* | 9/2010 | Kao | A45C 11/00 206/320 |
| 2010/0230301 | A1* | 9/2010 | Fellig | H04M 1/04 206/232 |
| 2011/0031287 | A1* | 2/2011 | Le Gette | F16M 11/04 224/101 |
| 2011/0064401 | A1 | 3/2011 | Desorbo | |
| 2011/0136555 | A1 | 6/2011 | Ramies et al. | |
| 2011/0192857 | A1 | 8/2011 | Rothbaum et al. | |
| 2011/0253569 | A1* | 10/2011 | Lord | B65D 25/20 206/320 |
| 2011/0267748 | A1 | 11/2011 | Lane et al. | |
| 2012/0024741 | A1 | 2/2012 | Beatty et al. | |
| 2012/0043236 | A1 | 2/2012 | Szucs et al. | |
| 2012/0050968 | A1 | 3/2012 | Child et al. | |
| 2012/0074006 | A1 | 3/2012 | Monaco et al. | |
| 2012/0270600 | A1 | 10/2012 | Zelson | |
| 2013/0015088 | A1 | 1/2013 | Wu | |
| 2013/0126565 | A1* | 5/2013 | Rostami | A45F 5/021 224/191 |
| 2013/0140312 | A1 | 6/2013 | Lane et al. | |
| 2013/0181584 | A1* | 7/2013 | Whitten | G06F 1/1656 312/223.1 |
| 2014/0360893 | A1 | 12/2014 | Whitten et al. | |

OTHER PUBLICATIONS

Iwowcase; http://www.iwowcase.com/pavel-2ng-g-360-degree-backside-holder-iphone5-casered-p-63; May 29, 2013(10 pages).

Wireless Solutions Soft Touch Cases; hftp://www.tessco.com/products/displayProducts.do?bgCategoryId=624969 [May 29, 2013 11:11:43 AM]; May 29, 2013 (2 pages).

Nite Ize Connect Case and Accessories; http://www.myvoiceconnm.com/cell-phone-mobile-device-accessory; May 29, 2013 (3 pages).

Kraken and Apollo Series; http://tridentcase.com/series/kraken-series.aspx and http://tridentcase.conn/series/apollo-series.aspx; May 29, 2013 (7 pages).

* cited by examiner

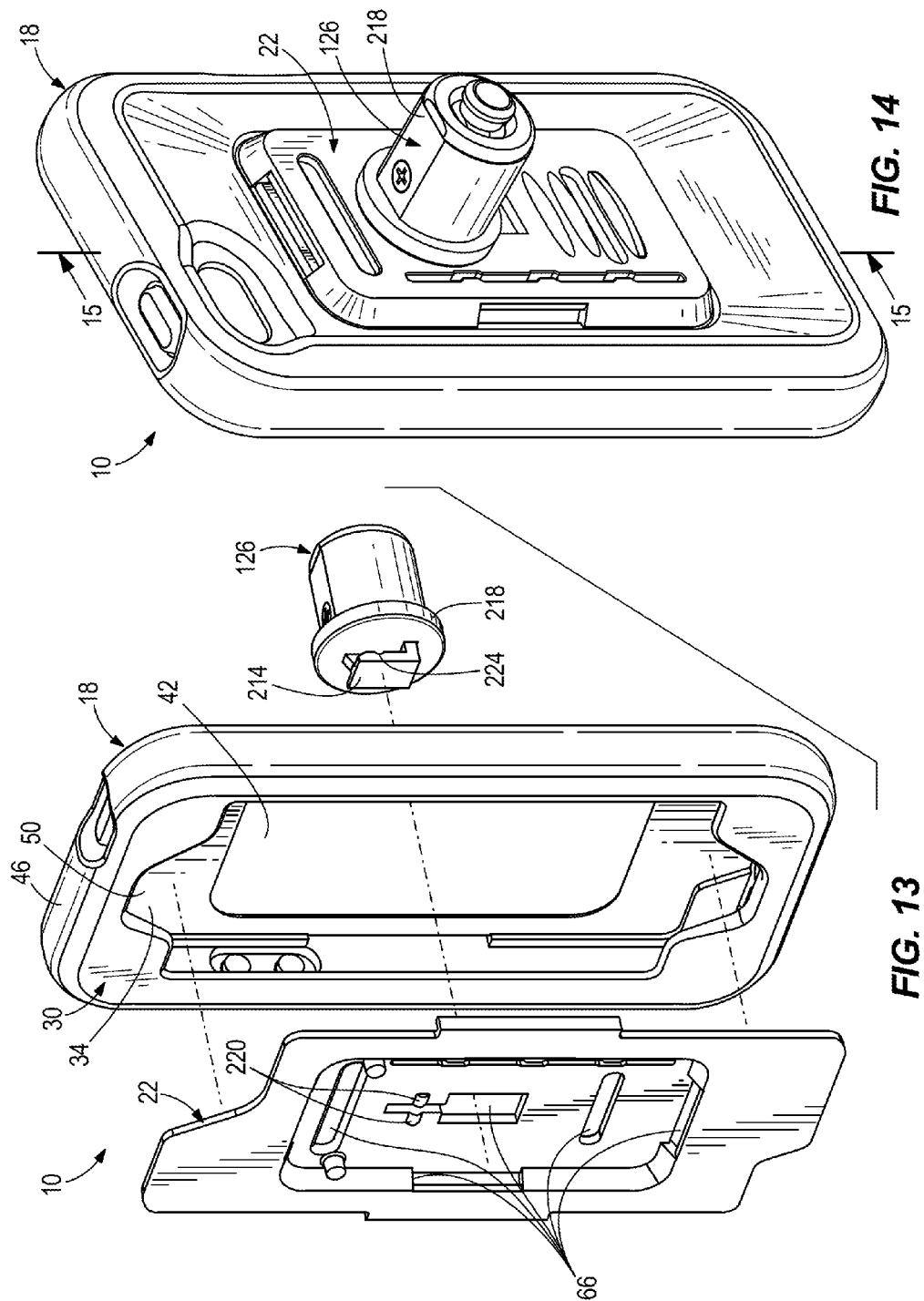

SYSTEM FOR COUPLING ACCESSORY DEVICES TO A PORTABLE ELECTRONIC DEVICE

BACKGROUND

The present invention relates to a system for coupling accessory devices to a portable electronic device, and specifically to a smart phone device.

Portable electronic devices, such as the iPhone®, are commonly carried and used in a variety of different environments, including at work, at school, outside, and while exercising. Many portable electronic devices come equipped with a casing that covers a portion or portions of the portable electronic device and protects the portable electronic device from damage and wear.

SUMMARY

In accordance with one construction, a system for coupling accessory devices to a portable electronic device includes a casing sized and configured to receive the portable electronic device. The casing defines a front opening through which a display screen of a received portable electronic device is accessible to a user, and a rear opening. The system further includes a plate element sized and configured to be inserted into the casing and to be positioned adjacent the rear opening such that a portion of the plate element is exposed by the rear opening. The system further includes an accessory device coupled to the plate element, the accessory device having an inner portion and an outer portion, such that when coupled to the plate element, at least part of the plate element is between the inner portion and the outer portion.

In accordance with another construction, a method of coupling accessory devices to a portable electronic device includes inserting a plate element into a casing, the casing defining a front opening through which a display screen of a received portable electronic device is accessible to a user, and a rear opening. The method also includes positioning the plate element such that the plate element is disposed adjacent the rear opening and such that a portion of the plate element is exposed by the rear opening. The method also includes coupling an accessory device to the plate element, the accessory device having an inner portion and an outer portion, such that when coupled to the plate element, at least part of the plate element is between the inner portion and the outer portion.

Other aspects of the invention will become apparent by consideration of the detailed description and accompanying drawings.

BRIEF DESCRIPTION OF THE DRAWINGS

FIG. 13 is an exploded, perspective view of the system of FIG. 1, utilizing a different accessory device than that illustrated in FIG. 1.

FIG. 14 is a back perspective view of the system of FIG. 13, fully assembled.

DETAILED DESCRIPTION

Figure 1:
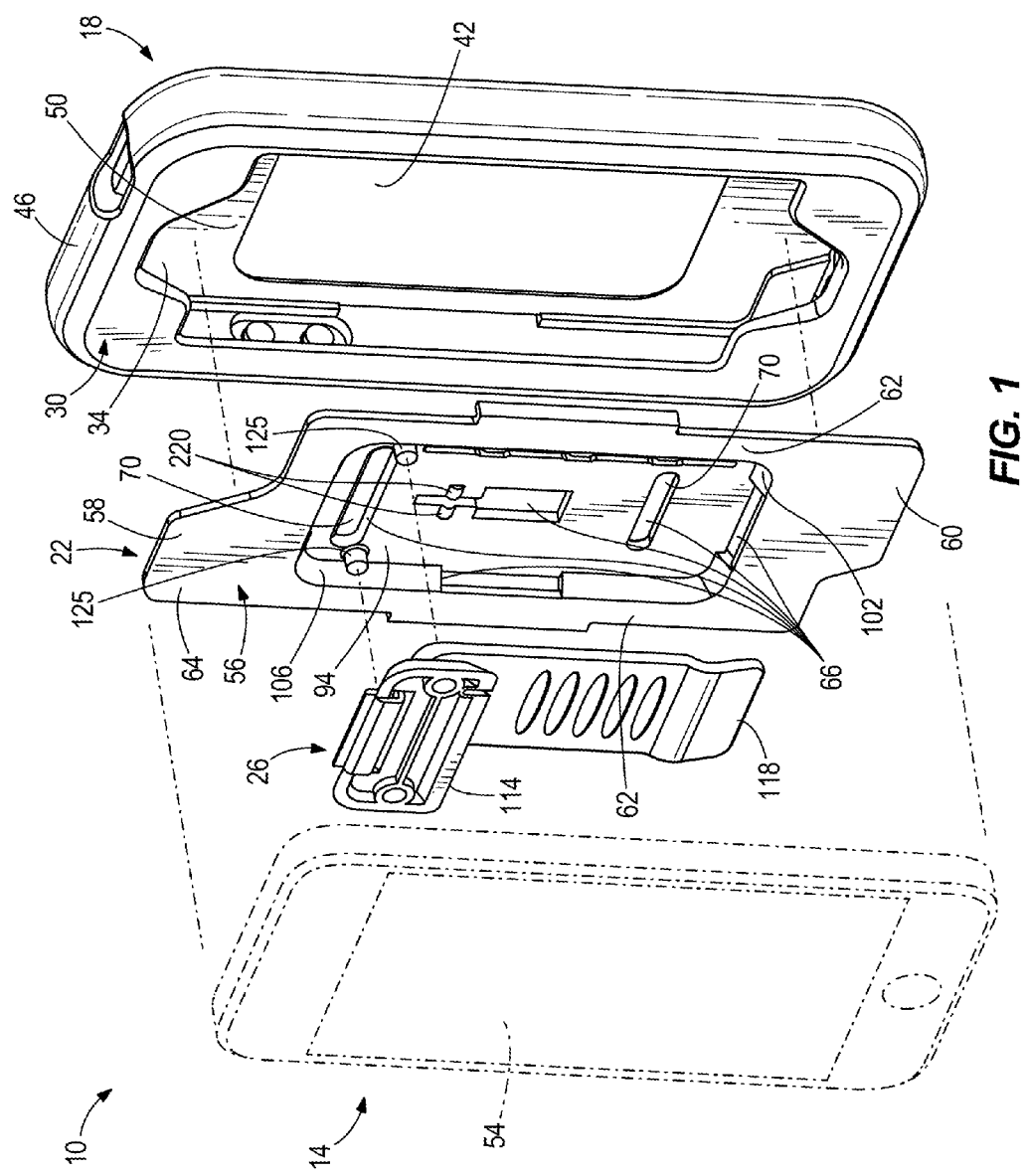
FIG. 1 is an exploded, perspective view of a system for coupling an accessory device to portable electronic device according to one construction of the invention.
Figure 2:
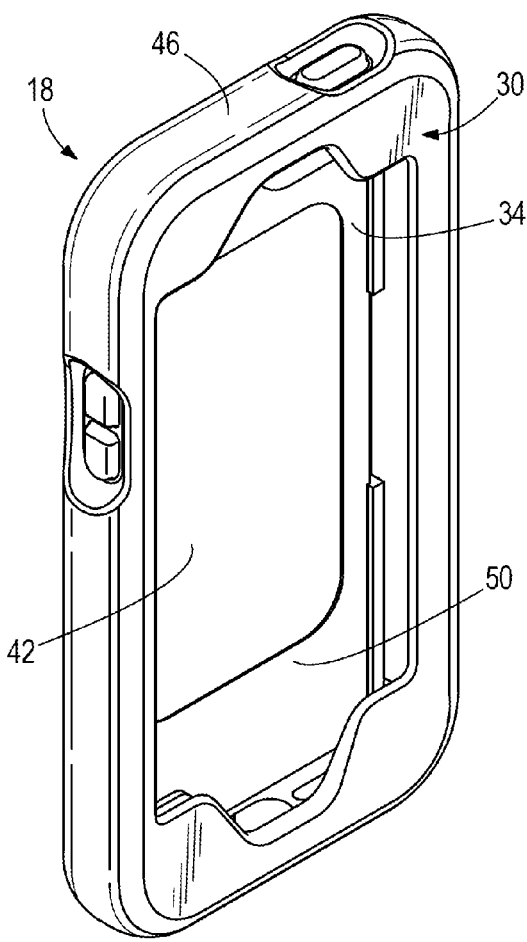
FIG. 2 is a front perspective view of a casing of the system of FIG. 1.
Figure 3:
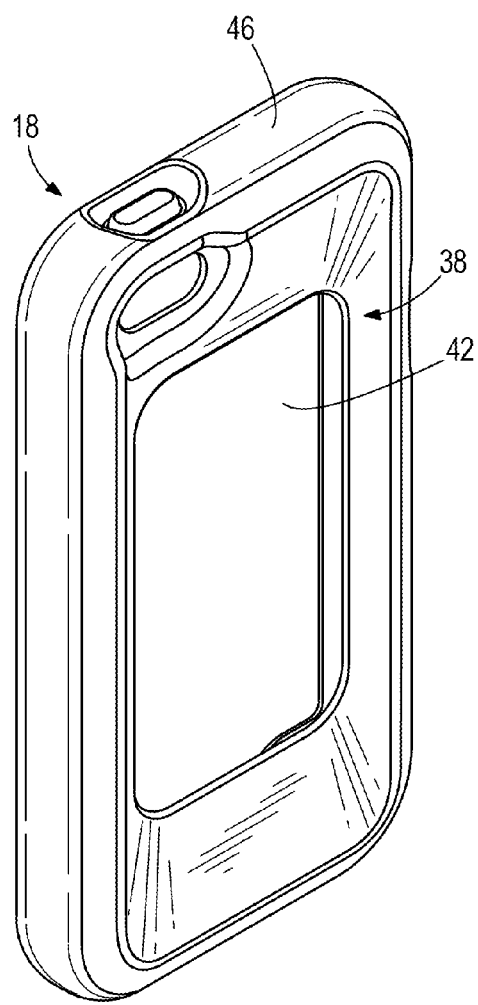
FIG. 3 is a back perspective view of the casing.
Figure 5:
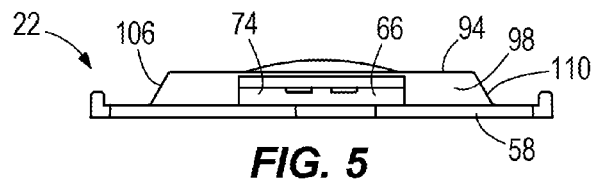
FIG. 5 is a top view of the plate element.
Figures 4, 7:
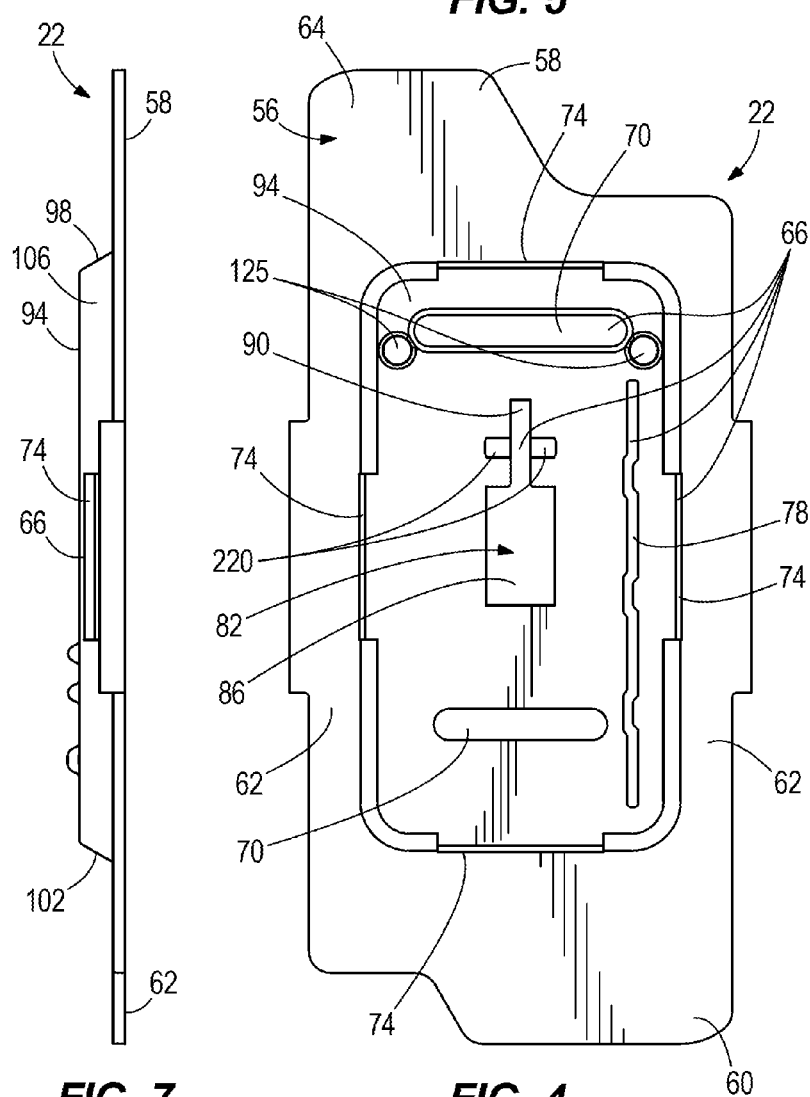
FIG. 4 is a front view of a plate element of the system of FIG. 1.
FIG. 7 is a right side view of the plate element.
Figure 8:
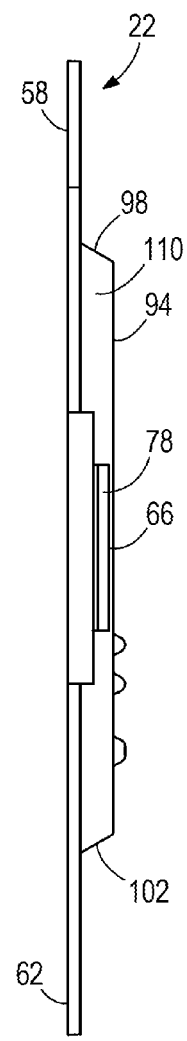
FIG. 8 is a left side view of the plate element.
Figure 6:
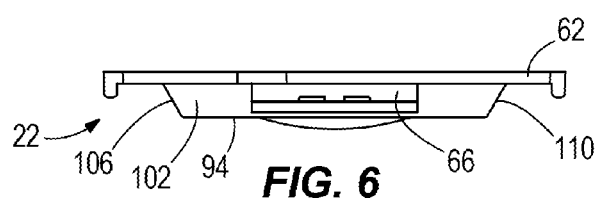
FIG. 6 is a bottom view of the plate element.
Figure 9:
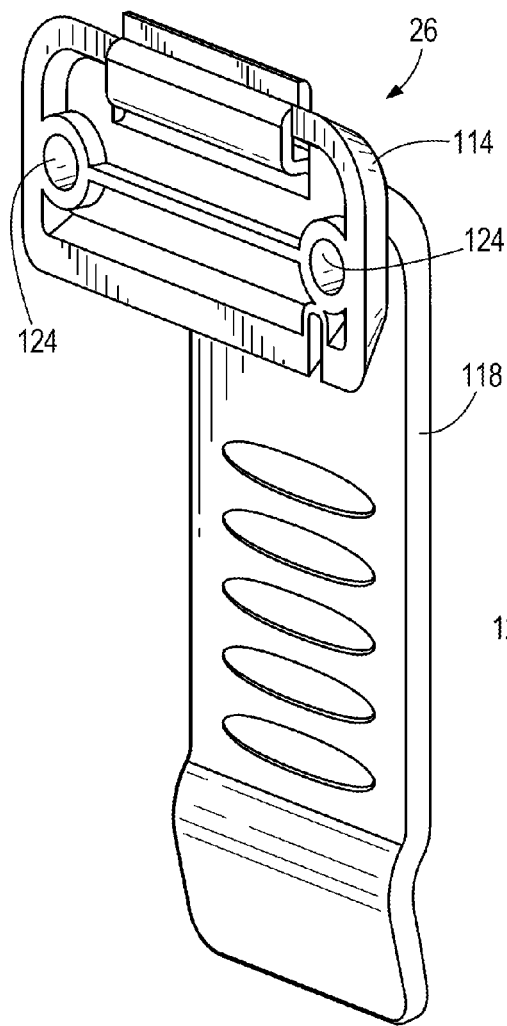
FIG. 9 is a front perspective view of an accessory device of the system of FIG. 1.
Figure 10:
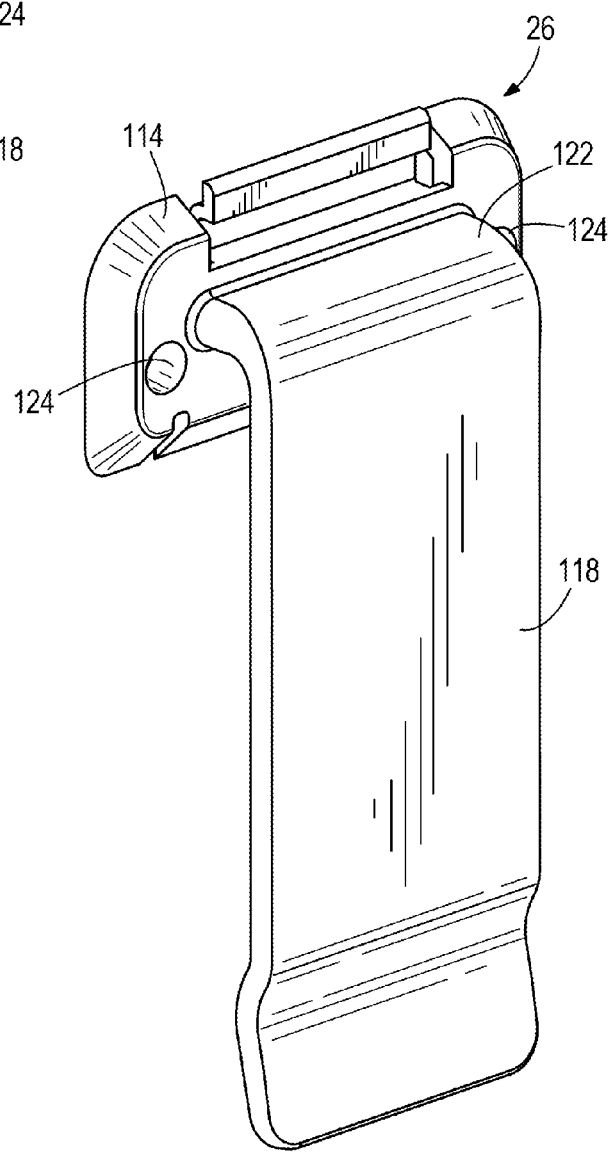
FIG. 10 is a back perspective view of the accessory device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-12 illustrate a system 10 for coupling accessory devices to a portable electronic device. The system 10 includes a portable electronic device 14, a casing 18 that removably couples to the portable electronic device 14, a plate element 22 that removably couples to the casing 18, and an accessory device 26 that removably couples to the plate element 22.

With reference to FIGS. 1-3, 11, and 12, the casing 18 is sized and configured to receive the portable electronic device 14. The casing 18 includes a front surface 30 with a front opening 34, a rear surface 38 with a rear opening 42, at least one intermediate surface 46 that connects the front and rear surfaces 30, 38, and an interior surface 50 adjacent the rear opening 42. The casing 18 is flexible, and is sized and configured to be stretched over and coupled to the portable electronic device 14 by stretching the front opening 34 or the rear opening 42 wide enough to receive the portable electronic device 14. In other constructions the casing 18 is rigid, and/or couples to the portable electronic device 14 in other manners (e.g., in a two-piece, clamshell manner).

Figure 12:
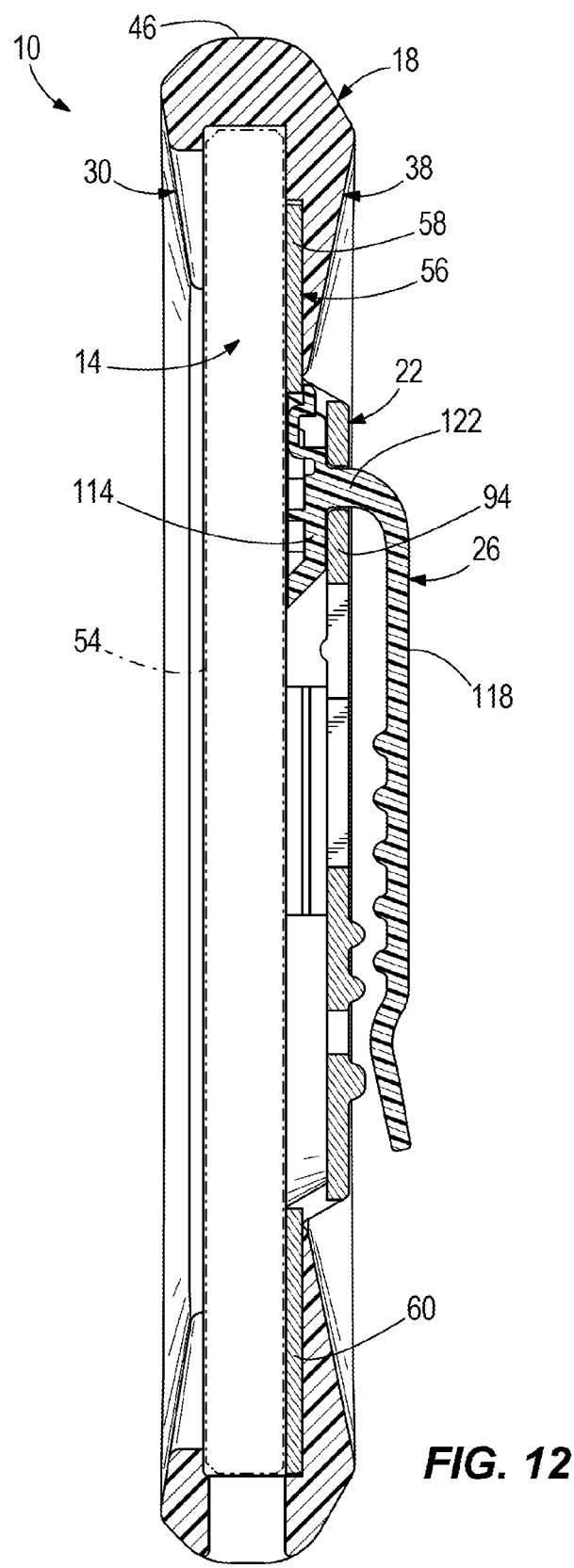
FIG. 12 is a cross-sectional view of the fully assembled system of FIG. 1, taken along lines 12-12 in FIG. 11.

With reference to FIGS. 1 and 12, when the casing 18 is coupled to the portable electronic device 14, a display screen 54 on the portable electronic device 14 is accessible to a user through the front opening 34.

With reference to FIGS. 1, 4-8, 11, and 12, the plate element 22 is sized and configured to be inserted into the casing 18 and to be positioned adjacent the rear opening 42, such that a portion of the plate element 22 is exposed by the rear opening 42. The plate element 22 is thin, rigid, and light-weight, and is sized and configured to be inserted into the casing 18 by stretching the front opening 34 or the rear opening 42 wide enough to receive the plate element 22 into the casing 18. In other constructions the plate element 22 is flexible, and/or couples to the casing 18 in other manners.

With continued reference to FIGS. 1, 4-8, 11, and 12, the plate element 22 includes a flange 56. The flange 56 includes a top portion 58 and a bottom portion 60, as well as two side portions 62 extending between the top and bottom portions 58, 60. The flange 56 has a generally flat surface 64. When the plate element 22 is coupled to the casing 18, at least one of the top portion 58, the bottom portion 60, and the side portions 62 is disposed adjacent to (e.g., is in contact with) the interior surface 50, and is not exposed by the rear opening 42. The plate element 22 is larger in at least one dimension than the rear opening 42, such that the plate element 22 does not fall or pass through the rear opening 42 when the at least one of the top portion 58, the bottom portion 60, and the side portions 62 are in contact with the interior surface 50. For example, in the illustrated constructions, the flange 56 is both wider and taller than the rear opening 42, such that the top portion 58, the bottom portion 60, and the side portions 62 each contact the interior surface 50 when the plate element 22 is coupled to the casing 18.

With continued reference to FIGS. 1 and 4-8, the plate element 22 includes a plurality of openings 66. The illustrated plate element 22 includes eight different openings 66, although other constructions include different numbers of openings 66. For example, in some constructions the plate element 22 includes six openings. In some constructions the plate element 22 includes 10 openings. With reference to FIGS. 4-8, the openings 66 include at least two elongate slots 70 that are oriented generally parallel to one another, as well as at least two elongate slots 74 that are oriented generally perpendicular to one another. The openings 66 also include at least one elongate, jagged slot 78, and at least one multi-width slot 82 having a first portion 86 with a first width and a second portion 90 with a second, smaller width.

With reference to FIGS. 4-8 and 11, the plate element 22 also includes a first, primary wall 94, a second wall 98 extending from the primary wall 94, a third wall 102 extending from the primary wall 94, a fourth wall 106 extending from the primary wall 94, and a fifth wall 110 extending from the primary wall 94. The walls 98, 102, 106, 110 extend between the wall 94 and the flange 56, with the wall 94 being generally parallel to the flange 56. When the plate element 22 is coupled to the casing 18, the walls 94, 98, 102, 106, and 110 are exposed through the rear opening 42. In some constructions, only the wall 94 is exposed through the rear opening 42. In some constructions, the wall 94 is disposed generally flush with the rear surface 38. In some constructions, such as the illustrated constructions, the wall 94 extends past or protrudes from the rear surface 38 when the plate element 22 is coupled to the casing 18.

The wall 94 includes the two elongate slots 70, the jagged slot 78, and the multi-width slot 82. The walls 98, 102, 106, and 110 each include one of the slots 74. Other constructions of the plate element 22 include different arrangements, sizes, types, and orientations of the openings 66 than those illustrated.

With reference to FIGS. 9-12, the illustrated accessory device 26 is a belt clip. The accessory device 26 is sized and configured to be coupled to the plate element 22 so that the portable electronic device 14 may be worn adjacent a user's waist on the outside of a user's belt. The accessory device 26 includes an inner portion 114 (i.e., the base or mounting portion) and an outer portion 118 (i.e., the clip portion), as well as an intermediate portion 122 that connects the inner and outer portions 114, 118. When the accessory device 26 is coupled to the plate element 22, at least part of the plate element 22 (e.g., the primary wall 94) is disposed between the inner portion 114 and the outer portion 118.

Figure 11:
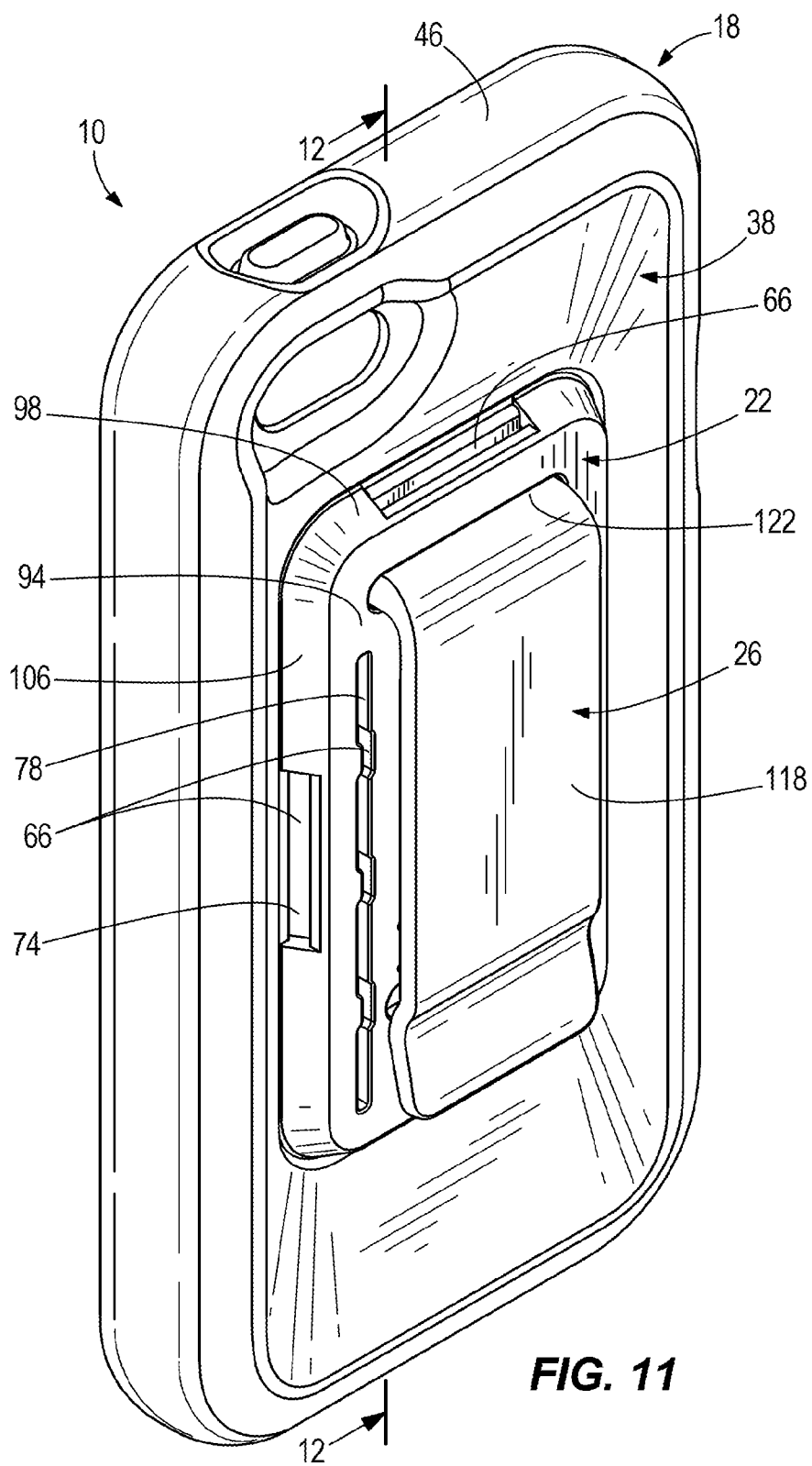
FIG. 11 is a back perspective view of the system of FIG. 1, fully assembled.

To assemble the system 10, the outer portion 118 is first inserted through one of the slots 70, and the accessory device 26 is then rotated relative to the plate element 22 until the wall 94 is disposed between the inner portion 114 and the outer portion 118, and both the inner portion 114 and the outer portion 118 are extending generally parallel to the primary wall 94 (e.g., as illustrated in FIGS. 11 and 12). With reference to FIGS. 1, 4, 9, and 10, the inner portion 114 also includes apertures 124 that receive projections 125 on the plate element. After the outer portion 118 is inserted through the slots 70, the apertures 124 are passed over the projections 125 to further secure and releasably couple the accessory device 26 to the plate element 22.

With the accessory device 26 coupled to the plate element 22, the combination of the accessory device 26 and plate element 22 is then inserted into the casing 18 (e.g., through the front opening 34). The plate element 22 is inserted until the top portion 58 and the bottom portion 60 of the plate element 22 are pressed against the interior surface 50 of the casing 18 and the primary wall 94 is exposed through the rear opening 42, with the outer portion 118 of the accessory device 26 being disposed outside of the casing 18 (i.e., protruding from the rear surface 38).

In some constructions the plate element 22 is first coupled to the casing 18 prior to coupling the accessory device 26 to the plate element 22. For example, in some constructions the plate element 22 is inserted into the casing 18, and the top portion 58 and the bottom portion 60 of the plate element 22 are pressed against the interior surface 50. The outer portion 118 of the accessory device 26 is then inserted through the slot 70, until the primary wall 94 is disposed between the inner and outer portions 114, 118.

With the accessory device 26, the plate element 22, and the casing 18 all coupled together, the combined accessory device 26, plate element 22, and casing 18 are then coupled to the portable electronic device 14. Specifically, the casing 18 receives the portable electronic device 14 through the front opening 34. When the portable electronic device 14 is disposed inside the casing 18, the display screen 54 is viewable through the front opening 34, and the portable electronic device 14 presses against the flat surface 64 of the flange 56, as well as the inner portion 114 of the accessory device 26, thereby securing the accessory device 26 to the portable electronic device 14. In some constructions, the portable electronic device 14 presses against only one of the flange 56 and the inner portion 114.

To disassemble the system 10, the steps described above are performed in reverse order.

The plate element 22 is sized and configured to couple to a variety of different accessory devices. For example, and with reference to FIGS. 13-15, the plate element 22 is sized and configured to couple with an accessory device 126 that is an attachment mechanism for a lock. Examples of such an attachment structure for a lock can be seen in U.S. Patent Publication No. 2012/0317779 and U.S. Patent Publication No. 2012/0318711, the entire contents of each of which are incorporated by reference herein.

The accessory device 126 is similar to the accessory device 26 in that the accessory device 126 includes an inner portion 214 (i.e., the mounting structure) and an outer portion 218 (i.e., the lock attachment structure). When the accessory device 126 is coupled to the plate element 22, at least part of the plate element 22 (e.g., the primary wall 94) is disposed between the inner portion 214 and the outer portion 218.

To replace the accessory device 26 with the accessory device 126, the portable electronic device 14 is first removed from the casing 18. The accessory device 26 is then removed from the plate element 22, and the inner portion 214 of the accessory device 126 is inserted into the multi-width slot 82. The accessory device 126 is moved up through the slot 82, such that the inner portion 214 slides from the wider first portion 86 to the narrower second portion 90. The inner portion 214 is wider than the second portion 90, such that once the accessory device 126 is moved up into the second portion 90, the accessory device 126 is prevented from easily disconnecting with the plate 22, and the primary wall 94 of the plate element 22 is disposed between the inner and outer portions 214, 218.

Figure 15:
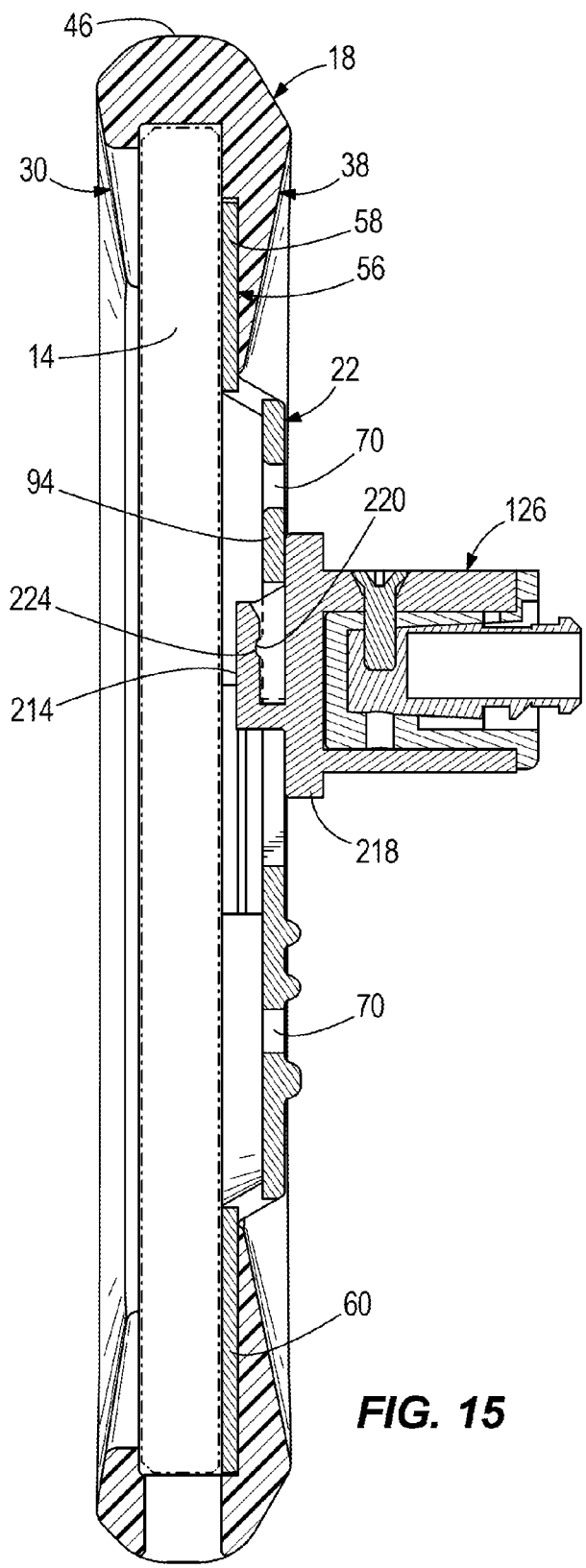
FIG. 15 is a cross-sectional view of the fully assembled system of FIG. 13, taken along lines 15-15 in FIG. 14.

With reference to FIGS. 1 and 15, as the inner portion 214 is moved up into the second portion 90, the inner portion 214 also passes over two projections 220 disposed along the interior surface 50 of the plate 22. The projections 220 engage a recess 224 in the inner portion 214, helping to secure (i.e., releasably snap) the inner portion 214 to the plate 22.

Figure 16:
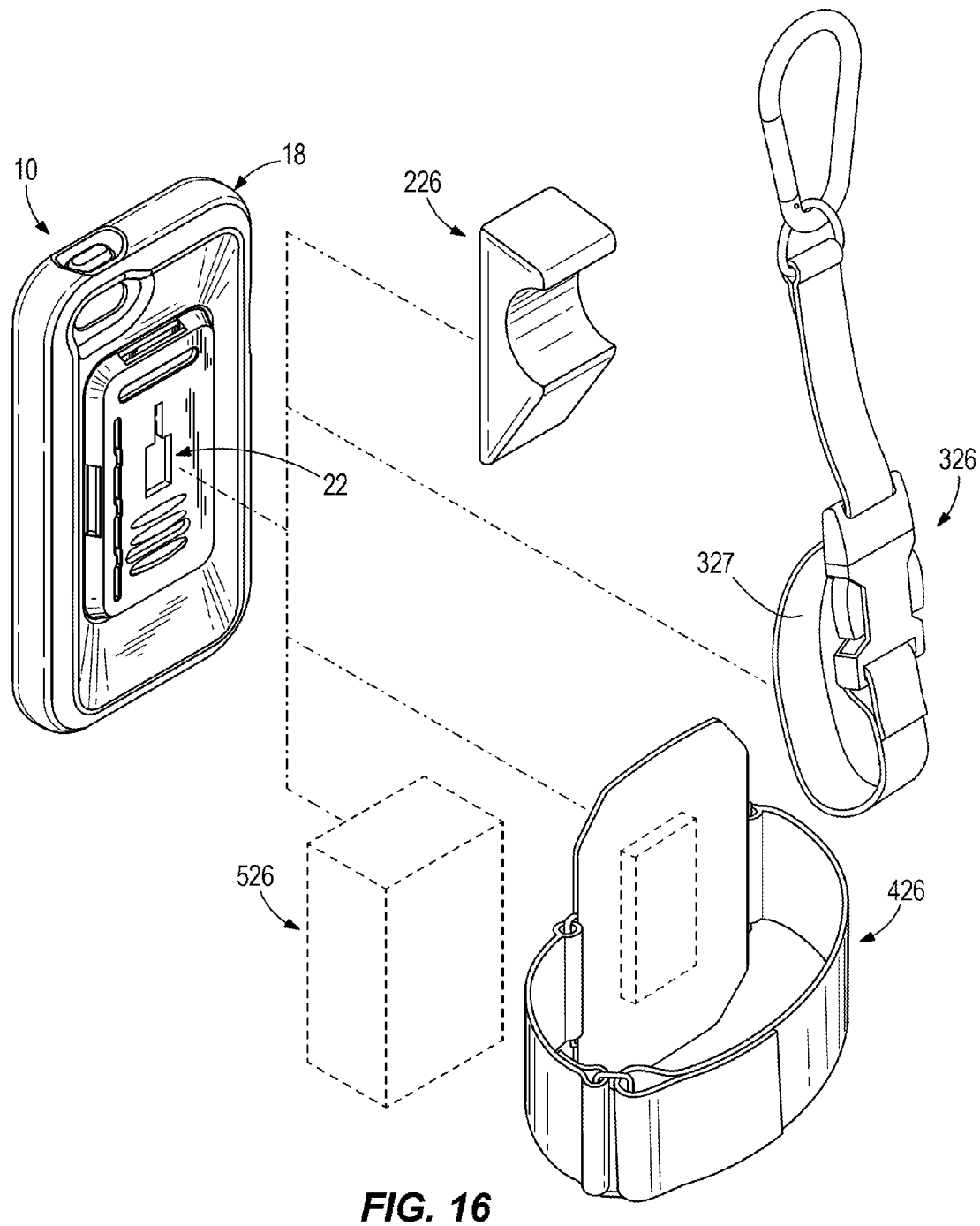
FIG. 16 is an exploded, perspective view of the system of FIG. 1, utilizing different accessory devices than those illustrated in FIGS. 1 and 13.

FIG. 16 illustrates a plurality of other accessory devices that may be used with the plate 22, including an accessory device 226 that operates as a handle bar mount, an accessory device 326 that operates as a carabiner strap, an accessory device 426 that operates as a sports arm band, and a schematically-illustrated accessory device 526 that represents in general other possible accessory devices such as a bill fold, camera mount, suction mount, or headphone storage assembly that may be coupled with the plate element 22. The accessory devices 226, 326, 426, and 526 each include inner portions and outer portions, similar to the accessory devices 26 and 126, such that when the accessory devices 226, 326, 426, and 526 are coupled to the plate element 22, at least part of the plate element 22 (e.g., the primary wall 94) is disposed between the inner and outer portions. For example, the accessory device 326 includes at least one strap 327 that passes through two or more of the slots 70, 74 to couple the accessory device 326 to the plate element 22. The system 10 described above provides benefit to a user with an active lifestyle (e.g., someone who runs, bikes, hikes, etc.), as well as to someone who wants to carry a portable electronic device 14 while on the job (e.g., at a construction site). To use the system 10 a user simply couples an appropriate accessory device 26, 126, 226, 326, 426, or 526 to his or her plate element 22, depending on user preference, and then removes or replaces the accessory device 26, 126, 226, 326, 426, or 526 as desired.

Various features and advantages of the invention are set forth in the following claims.

The invention claimed is:

1. A system for coupling accessory devices to a portable electronic device, the system comprising:
   a casing sized and configured to receive the portable electronic device, the casing defining a front opening through which a display screen of a received portable electronic device is accessible to a user, and a rear opening;
   a plate element sized and configured to be inserted into the casing and to be positioned adjacent the rear opening such that a portion of the plate element is exposed by the rear opening, the portion of the plate element extending through the rear opening and including an opening; and
   an accessory device sized and configured to be coupled to the plate element, the accessory device having an inner portion and an outer portion, the accessory device extending through the opening of the plate element such that at least part of the plate element is between the inner portion and the outer portion.

2. The system of claim 1, wherein the plate element includes a plurality of openings.

3. The system of claim 2, wherein the plurality of openings includes two slots oriented perpendicular to one another.

4. The system of claim 2, wherein the plurality of openings includes 6 openings.

5. The system of claim 1, wherein the plate element includes a first, primary wall, a second wall extending from the primary wall, a third wall extending from the primary wall, a fourth wall extending from the primary wall, and a fifth wall extending from the primary wall.

6. The system of claim 5, wherein when the plate element is inserted into the casing, a portion of the plate element is disposed on a first side of the casing, and the primary wall is disposed on an opposite side of the casing.

7. The system of claim 5, wherein the primary wall includes a first elongate slot, and wherein the fifth wall includes a second elongate slot.

8. The system of claim 1, wherein the accessory device is a first accessory device, and further including a second, different accessory device sized and configured to be coupled to the plate element, the second accessory device having an inner portion and an outer portion, such that when coupled to the plate element, at least part of the plate element is between the inner portion and the outer portion of the second accessory device.

9. The system of claim 8, wherein one of the first accessory device and the second accessory device is a belt clip.

10. The system of claim 8, wherein one of the first accessory device and the second accessory device is an attachment device of a lock.

11. The system of claim 1, wherein the casing is flexible, and the plate element is rigid.

12. A method of coupling accessory devices to a portable electronic device, the method comprising:
    inserting a plate element into a casing, the casing defining a front opening through which a display screen of a received portable electronic device is accessible to a user, and a rear opening;
    positioning the plate element such that the plate element is disposed adjacent the rear opening and such that a portion of the plate element is exposed by the rear opening, the portion of the plate element including an opening, wherein the step of positioning the plate element includes extending the portion of the plate element through the rear opening; and
    coupling an accessory device to the plate element by inserting the accessory device through the opening, the accessory device having an inner portion and an outer portion, wherein the accessory device extends through the opening such that at least part of the plate element is between the inner portion and the outer portion.

13. The method of claim 12, wherein the casing is flexible, and the step of inserting the plate element into the casing includes stretching one of the front opening and the rear openings to permit insertion of the plate element.

14. The method of claim 12, wherein the step of coupling the accessory device to the plate element includes extending one of the inner portion and the outer portion of the accessory device through one of a plurality of openings on the plate element.

15. The method of claim 14, further comprising removing the accessory device from the plate element and coupling a different accessory device to the plate element.

16. The method of claim 15, wherein the step of coupling the different accessory device to the plate element includes extending one of an inner portion and an outer portion of the different accessory device through one of the plurality of openings.

17. The method of claim 12, wherein the step of positioning the plate element includes positioning a top portion of the plate element adjacent an interior surface of the casing.

18. The method of claim 17, wherein the step of positioning the plate element includes pressing the top portion against the interior surface of the casing.

19. The method of claim 12, wherein the step of coupling an accessory device to the plate element includes sliding the inner portion of the accessory device into a slot disposed along the plate element.

* * * * *